United States Patent [19]
Shah et al.

[11] Patent Number: 6,072,466
[45] Date of Patent: *Jun. 6, 2000

[54] VIRTUAL ENVIRONMENT MANIPULATION DEVICE MODELLING AND CONTROL

[75] Inventors: Jain K. Shah, Stanmore; Richard D. Gallery, Horley; Dale R. Heron, Crawley, all of United Kingdom

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/904,390

[22] Filed: Aug. 1, 1997

[30] Foreign Application Priority Data

Aug. 2, 1996 [GB] United Kingdom ............... 9616261

[51] Int. Cl.$^7$ ........................................ G09G 5/00
[52] U.S. Cl. .............................. 345/156; 345/8
[58] Field of Search ................... 345/156, 157, 345/158, 161, 163, 7, 8, 9, 169, 159, 162

[56] References Cited

U.S. PATENT DOCUMENTS

| | | |
|---|---|---|
| 4,937,444 | 6/1990 | Zimmerman . |
| 5,320,538 | 6/1994 | Baum ........................................ 345/8 |
| 5,590,062 | 12/1996 | Nagamitsu et al. ..................... 345/8 |

FOREIGN PATENT DOCUMENTS

| | | | |
|---|---|---|---|
| 0211984A1 | 8/1985 | European Pat. Off. | ........ G06K 11/06 |
| 0502643A2 | 9/1992 | European Pat. Off. | ......... G09G 5/00 |
| WO9218925 | 10/1992 | WIPO | ............................... G06F 3/00 |

OTHER PUBLICATIONS

Paul Jerome Kilpatrick, "The Use A Kinesthetic Supplement In An Interactive Graphics System", pp 1–52, 1976.

Primary Examiner—Xiao Wu
Attorney, Agent, or Firm—Brian J. Weighaus

[57] ABSTRACT

A method and apparatus are provided for providing user-directed operation of a virtual manipulator, such as a simulated hand or claw (30) within a computer-generated virtual environment. The environment comprises one or more objects (32) which may be held, released or impelled by the manipulator under user control. Movement of the virtual manipulator is directed by a suitable hand held device operated by a user, with a simple control directing opening or closing of the claw (30). In operation, actions such as throwing, catching or punching an object (32) are partially automated, with the decision as to the action initiated being determined by the separation (D) between object and manipulator, and the current and previous states of each as recorded in the form of respective state variables. A method for the derivation of an applied velocity for the object acted upon is also described.

12 Claims, 4 Drawing Sheets

VIRTUAL ENVIRONMENT MANIPULATION DEVICE MODELLING AND CONTROL

BACKGROUND OF THE INVENTION

The present invention relates to a method and apparatus for providing user-directed control of a virtual-environment manipulator, and particularly, but not exclusively, where such a manipulator is controlled to follow, at least partially, the movements of a users limb and reproduce such movements within a virtual environment.

The form taken by the virtual environment will depend on the intended use of the system and may, for example, comprise the interior of a building for an architectural modelling application, or urban or surreal landscapes for games or other applications, around which environment a virtual manipulator controlled by the user is moved. The modelled form of the virtual manipulator may vary as required by the application (along with the form of the virtual objects to be manipulated), from simulacra of human hands or animal claws, through other biological grasping devices (such as the tentacles or suction pads of an octopus) to mechanical equivalents and specialised tools. Whatever the particular form, the manipulator must be able (under direct or indirect user control) to hold an object (such that it may be moved or stopped from movement by the manipulator), it must be able to release an object once held, and it must be able to impart motion to an object (pushing) without having first to hold it. In the following, the term "virtual environment" will be used for all such computer-generated virtual landscapes or situations: the term "physical environment" will be used to denote the 'real-world' surroundings of the user, for example a room in which the user contacts the various hardware devices, such as a head-mounted display (HMD), which provide the interface to the virtual environment. The terms "virtual body" and "physical body" should be construed accordingly.

One example of a virtual manipulator controlled through a haptic glove is described in International Patent Application WO92/18925 (W. Industries). Within the virtual environment (viewed for example via HMD) the users hand appears as a cursor, which undergoes changes corresponding with movement and flexure of the users hand, by means of which cursor the user interacts with the objects by "picking them up" or "moving them about". A similar three-dimensional cursor, again directed via a glove with mounted flexure sensors, is described in European patent application EP-A-0 211 984 (Lanier et al).

A problem with these systems is their intent to accurately monitor and reproduce the motions of a users hand (along with added features such as the tactile feedback of WO 92/18925) which greatly increases the processing capacity required. This processing requirement may be lessened if short cuts are taken with, for example, the generation of the virtual environment, but this may be counter-productive in actually reducing the users sense of immersion.

It is therefore an object of the present invention to provide a means for manipulation of virtual objects modelled in a three-dimensional environment.

It is a further object to provide such means having lower processing requirements than has heretofore been the case.

SUMMARY OF THE INVENTION

In accordance with a first aspect of the present invention there is provided a method for providing user-directed operation of a virtual manipulator within a computer-generated virtual environment, said environment comprising one or more objects which may be held, released or impelled by the manipulator under user control, the method comprising: providing user operable positional input means by use of which the user is enabled to move the virtual manipulator about the virtual environment; providing user operable actuator means in response to operation of which by the user the virtual manipulator is changed from a holding to a releasing orientation, or from a releasing to a holding orientation; providing automation of manipulation actions on an object by the manipulator when certain predetermined and periodically monitored conditions are found to be true, said conditions comprising at least: whether or not the manipulator was previously in a holding orientation; the separation of the manipulator and the said object; whether or not the manipulator is currently in a holding orientation; and whether or not the manipulator previously held the object.

By partially automating these interactions between the manipulator and objects, the processes become far simpler to reproduce and detailed tracking and modelling of a users hand, for example, is unnecessary. The automated manipulation action may suitably comprise the manipulator taking hold of an object when the manipulator is changed from a releasing to a holding orientation and the separation of the manipulator and the said object is less than or equal to a first predetermined threshold value: as the companion to this, the automated manipulation action may comprise the manipulator releasing a currently held object when the manipulator is changed from a holding to a releasing orientation.

In order to turn a simple release into a throw, a currently held object may be given a velocity on release, with that velocity being derived from the user directed motion of the manipulator prior to release. Depending on the extent to which the user directed motion is monitored, a currently held object may further be given a degree of spin on release. Such velocity might also be applied where the automated manipulation action comprises impelling the object with the velocity as derived from the preceding user directed motion of the manipulator; the difference between a throw and impelling the object may be determined by the separation of the manipulator and the object being less than or equal to a second predetermined threshold value and the manipulator being in the holding orientation prior to the impelling of the object. This velocity might be derived by maintaining a record of the n most recent locations of the manipulator within the virtual environment and the times at which the manipulator was at these locations, with the derived velocity applied to the object being determined by averaging a calculated velocity for the manipulator at two or more of these locations.

In accordance with a further aspect of the present invention there is provided a virtual manipulator modelling and control apparatus operable to generate and animate under user direction a representation of a manipulator in a virtual environment and the interaction thereof with representations of objects also generated within the virtual environment, the apparatus comprising: a first data store, holding data defining the virtual environment and the or each object therein; a second data store, holding data defining features of the virtual manipulator representation; a user-operable control device; and processing means arranged to generate a representation of the virtual environment based on data from the first data store and from a first viewpoint, to generate the manipulator representation within the virtual environment based on data from the second data store, and to periodically modify the generated manipulator representation in response to signals received from the user-operable control means;

characterised in that the apparatus further comprises: storage means holding respective data structures for the manipulator and for the or each object, said data structures being periodically updated by the processing means and containing for the manipulator a state variable indicating whether the manipulator is displayed in an open orientation or a closed orientation and for the or each object a state variable indicating whether or not the object is currently held by the manipulator; and first position determination means arranged to determine a current separation within the virtual environment between the manipulator representation and an object representation, the processing means being arranged to autonomously implement one or more manipulator actions on an object when the said current separation is less than or equal to a predetermined value, and the current and at least one preceding one of the state variables have predetermined settings.

The user-operable control device may be arranged to be held in a users hand, with the apparatus including second position determining means operable to detect a location of said control device relative to a predetermined origin position, and the processing means being arranged to periodically modify the generated representation of the manipulator within the virtual environment to reproduce movements of the hand-held control device in the manipulator. Note that, as used herein, "position" indicates both location and orientation for the control device and hence the manipulator.

The user operable control device may suitably comprise a pressure sensor arranged to determine a force exerted by the user, wherein when the exerted force exceeds a first threshold value, the processing means is arranged to modify the generated manipulator representation from an open orientation to a closed orientation, and modify the corresponding stored state variable. For release, the generated manipulator representation is suitably modified from a closed orientation to an open orientation when the exerted force drops below the first threshold when no object is held by the manipulator and below a second threshold value lower than the first when an object is held. In other words, the user is required to exert less force to maintain hold of an object than he/she had to exert to capture it in the first place.

BRIEF DESCRIPTION OF THE DRAWING

Further features and advantages will become apparent from reading of the following description of preferred embodiments of the present invention, given by way of example only, and with reference to the accompanying drawings in which.

DETAILED DESCRIPTION OF THE PREFERRED EMBODIMENTS

The following description is specifically concerned with modelling and controlling a virtual manipulator such as a hand or claw or mechanical equivalent, whether in isolation or as part of a virtual humanoid body that a user or participant in a virtual world may control and use to interact with objects within the virtual world, with the mechanism for control of the virtual manipulator movements being directed by measured movement of a hand-held device operated by the user, as well as by signals from that device. As will be readily appreciated, the techniques described may also be used for controlling movement of other parts of a virtual body.

Figure 1:
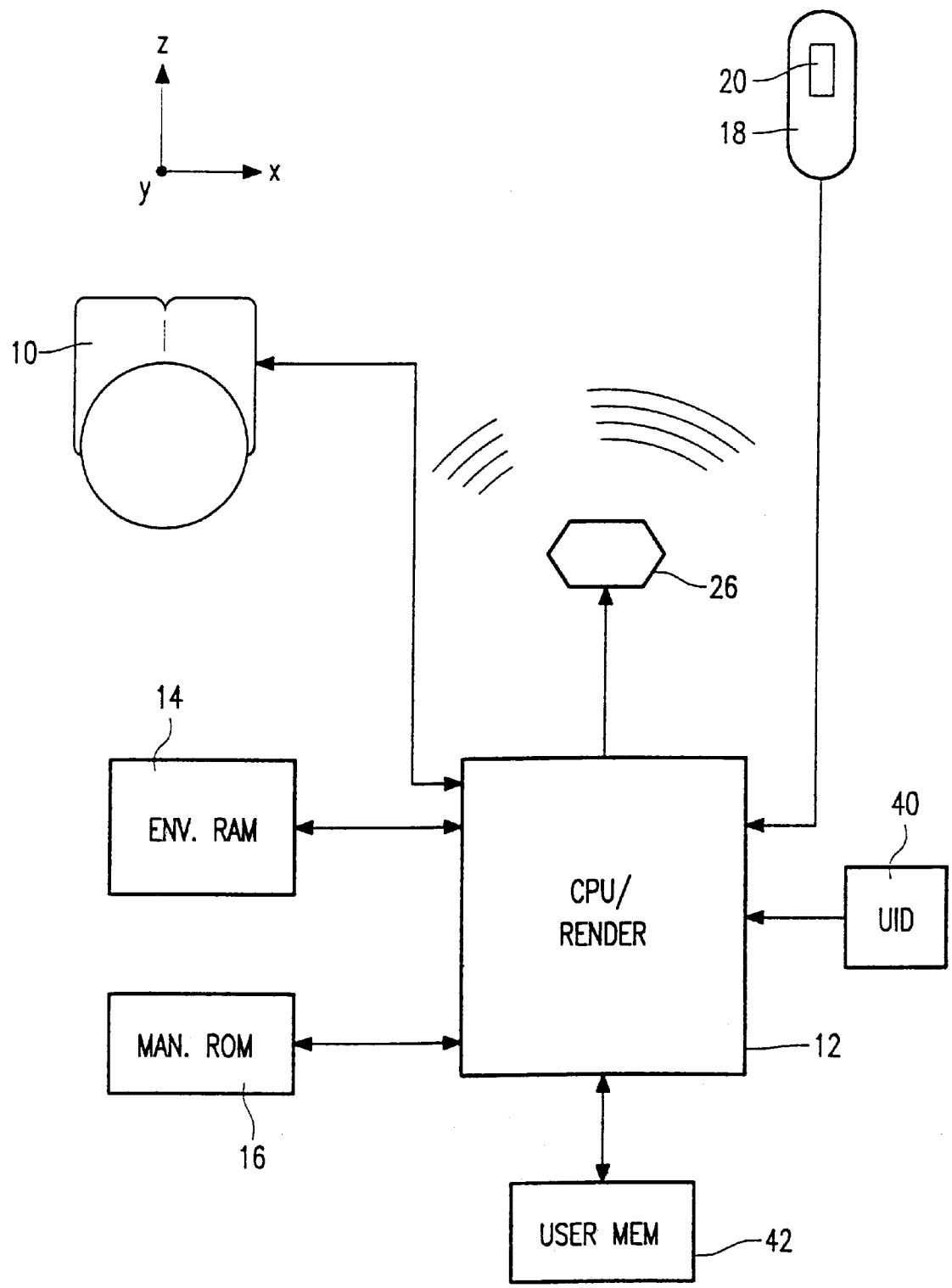
FIG. 1 is a plan schematic view of measurement and display apparatus embodying the present invention.

The arrangement for measuring the movement of the user hand is via an apparatus which translates the current physical position of a hand-held control into a measurement appropriate for input to a data processor. An embodiment of such an apparatus is illustrated in FIG. 1 which shows a plan view comprising a stereoscopic HMD unit 10 driven by a processing and rendering stage CPU 12 to display images of a virtual environment from a movable viewpoint. The images of the environment together with movable objects appearing within the environment are based on data from an environmental data store RAM 14 whilst a data file specifying the component parts of the virtual manipulator (to be rendered as an overlaid image appearing within the environment) is held in a read only memory 16 also coupled with the CPU 12.

Figure 2:
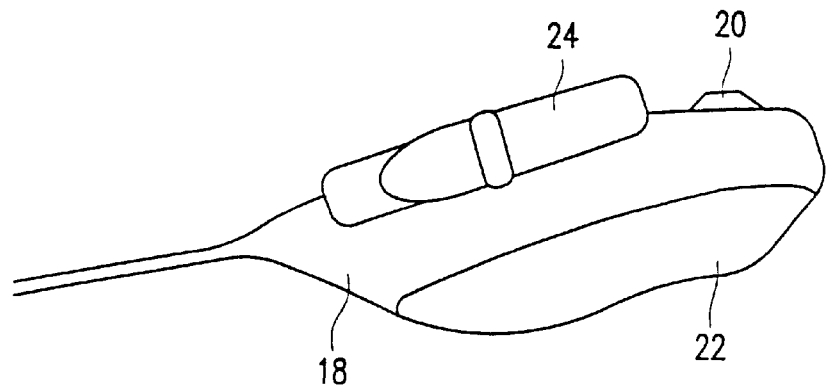
FIG. 2 is a side elevation of the hand-held controller of the apparatus of FIG. 1.

A hand-held user control 18 is provided, coupled with the CPU 12, and shown in greater detail in FIG. 2. The control has at least one actuating push-button 20 on the upper surface thereof which may suitably be operated by the thumb of a hand gripping it. On the underside of the control 18 are one or more pressure sensors 22 which are actuated by pressure from the fingers of the hand gripping the controller 18. For ease of control, a hand strap 24 may also be provided so that the user does not have to maintain a grip on the control at all times.

Reverting to FIG. 1, a source 26 of tracking signals is provided in a fixed position at the edge of the area where the user will be physically positioned. This source 26 suitably outputs source coordinate axes data in the form of a dipole electromagnetic field which field is detected by both the HMD 10 and the control device 18: on the basis of the coordinate data received and fed back to the CPU, it can be determined at any given time where both the HMD 10 and control device 18 are in relation to the three-dimensional coordinate set specified in the output from source 26.

Suitable forms of HMD and control, respectively marketed under the names Visette and V-Flexor, are available from Virtuality Entertainment Ltd of Virtuality House, Brailsford Industrial Park, Leicester, United Kingdom. Note that "Visette", "V-Flexor", and "Virtuality" are registered trade marks of Virtuality Technology Ltd.

Figure 3:
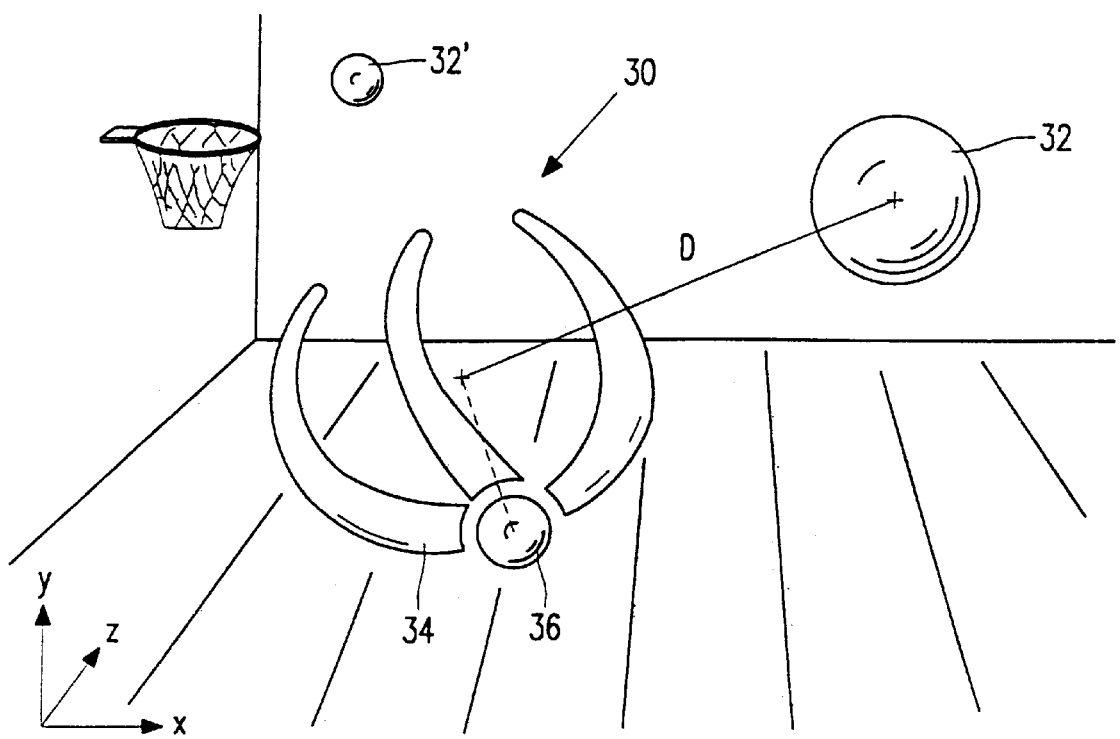
FIG. 3 shows a form of virtual manipulator modelled within a virtual environment, together with a number of environment objects for manipulation.

Once an interactive session has begun, the user is presented via the HMD 10 with an image, such as shown in FIG. 3, of the manipulator 30 (in the following a disembodied three-fingered claw) floating within the virtual environment. Other objects may be present in the virtual environment, such as balls 32 and 32', which the user may be intended to catch or throw. The three-dimensional movements that the user makes with the control device 18 are replicated by the movements of the virtual manipulator 30 within the virtual environment. The movements of the HMD 10 are also replicated in changes to the location of the viewpoint from which the image of the virtual environment is rendered. The movements are implemented in successive iterations of a simulation loop by the CPU 12. In each iteration, positional changes of the manipulator 30 (and the component parts thereof) are determined from the control 18, positional changes of any of the objects 32 within the virtual environment (whether directly or indirectly the result of user action, or as a result of the complete or partial autonomy of those objects within the confines of the simulation program) are calculated, and a revised image of the virtual environment (also taking account of any changes to the user viewpoint as indicated by signals from HMD 10) is rendered and presented to the user. As this movement will be limited due to physical movement being constrained by the apparatus, a means to enable more extensive movement within the virtual environment may be provided. Such a means is described in our pending unpublished United Kingdom patent application no.9613315.2, filed Jun. 25, 1996, which uses the, or one of the, buttons on a hand-held controller (such as controller 18; FIG. 2) to switch between a navigation mode and an interaction mode.

The simulation loop iteration frequency should be as high as possible within the constraints of available processing capability, and may vary during a session as the level and/or speed of interaction increases or decreases. A frequency as low as 12 to 14 Hz may still give acceptable results, although closer to (or preferably higher than) the video refresh rate of the rendered views is preferred. The video refresh rate is independent of the simulation frequency and constant.

The virtual manipulator 30 consists of three curved fingers 34 which are hinged at a spherical base 36 which represents the wrist of the user. These are all individual models and their basic positions (locations and orientations) are derived by the CPU 12 from a base point calculated from raw spatial data obtained from the controller 18, and spatial information relating to the user and derived from raw spatial data obtained from tracking HMD 10. In order that the user feels most comfortable with the correspondence between their physical actions and the resulting consequences in the virtual world, the position and orientation of the manipulator in the virtual world are adjustable per user, by virtue of a suitable input device 40 such as a keyboard coupled to the CPU 12 (FIG. 1). To provide for frequent users, a user memory 42 may additionally be provided holding details of individual setting preferences to avoid the need for such users to go through a full set-up procedure each session.

Figure 4:
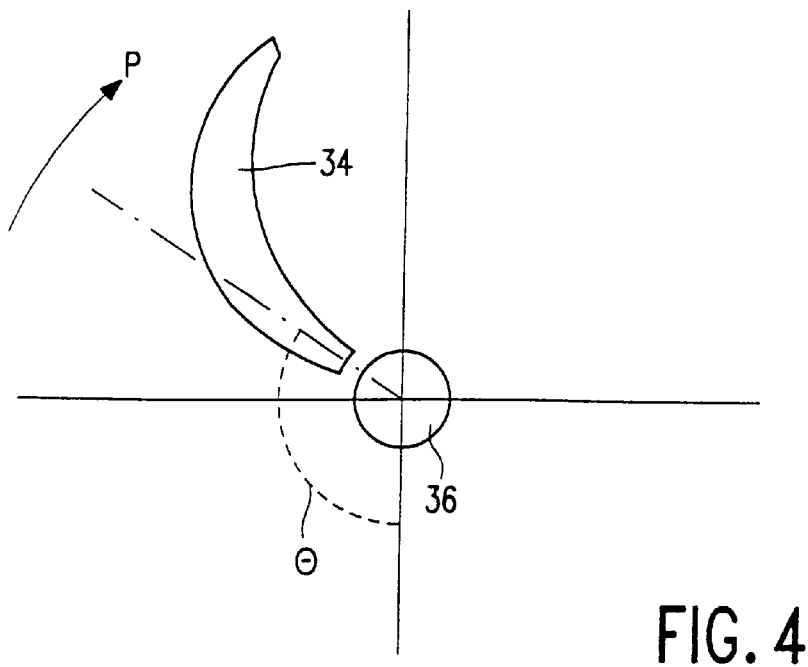
FIG. 4 is a schematic view of a part of the virtual manipulator from FIG. 3.

When none of the pressure sensors 22 on controller 18 are pressed, the manipulator claw is fully open and the fingers 34 of the claw are splayed apart. This is the default position of the claw. As the user grips the controller 18 more tightly, the angle $\theta$ at which the fingers 34 are hinged to the base (the "wrist" 36) increases as illustrated in FIG. 4, thus bringing the fingertips closer together and closing the claw. The or each of the pressure sensors 22 outputs an integer in the range 0–255, and the maximum value P given from any of the sensors is taken and used as an index to a pre-calculated look-up table, suitably stored in ROM 16, to give a "processed grip value" PGV from which the hinge angle $\theta$ is obtained as follows. The measured pressure P is first converted to a value TEMP, where:

$$TEMP = \left[\exp\left(\frac{255-P}{255}\right) - 2.7\right] \times 255 \times 1.5 \times (-1.7)$$

The processed grip value is then derived from:

IF TEMP≦255

THEN PGV=TEMP

Figure 5:
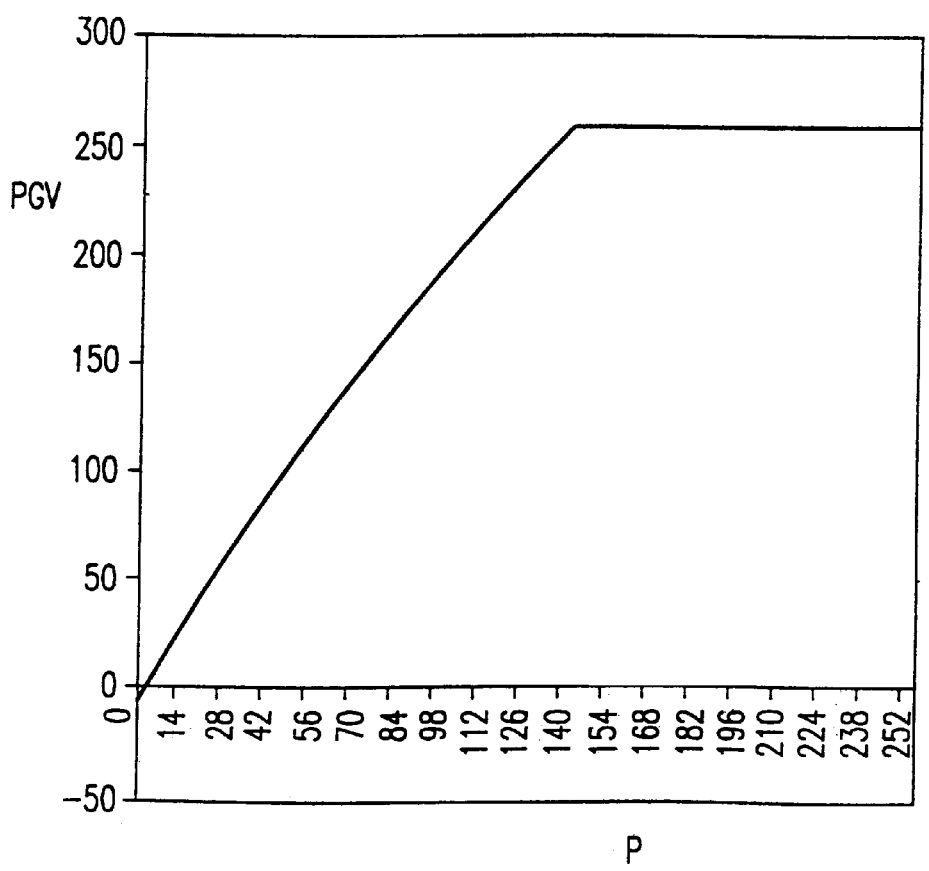
FIG. 5 is a graph showing the relationship between measured (physical) grip strength and resultant (virtual) grip power.

ELSE PGV=255 which produces the range of values for P against PGV shown in FIG. 5. The derivation of $\theta$ (as in FIG. 4) depends on whether or not an object is held and is as follows:

IF HELD=TRUE

THEN $\theta=-PI/4$

ELSE $\theta=-(\theta_{MIN}+(\theta_{STEP}\times PGV))$ where $\theta_{MIN}=PI/10$ $\theta_{MAX}=PI/2.5$ $\theta_{STEP}=(\theta_{MIN}+\theta_{MAX})/255$ As can be seen, the tighter the controller 18 is gripped, the greater P, and the greater the amount $\theta_{STEP}$ by which the claw closes. This closing mechanism is over-ridden when an object is being held (HELD=TRUE) so that the claw cannot be closed into the object: in the example of FIG. 3, the claw 30 should not be able to pierce the ball 32.

The capability for the user to close the virtual claw 30 provides the basic mechanism for catching/grabbing, holding, throwing and punching virtual objects (the ball 32 in the following discussion) by reflecting the natural movements of a real human hand. Note that the ball 32, the human user (as represented by the virtual manipulator 30) and any autonomous or pseudo-autonomous characters inhabiting the virtual environment are each regarded as objects which have individual data representations within CPU 12. Each of these data structures is updated once per simulation loop iteration.

It is necessary for a current interaction state for each object to be stored, in an individual data structure in the case of the manipulator and a common (shared) data structure for the manipulated objects so that appropriate action can be taken by object managers (object management subroutines in the CPU) when the objects are processed. The object managers decide the next course of action for each object that they manage in addition to calculating their new positions and orientations in virtual space. This is done by representing each interaction possibility as a distinct state and storing the data in the objects data structure. Since the claw is part of the human user object, its state information is stored there.

Figure 6:
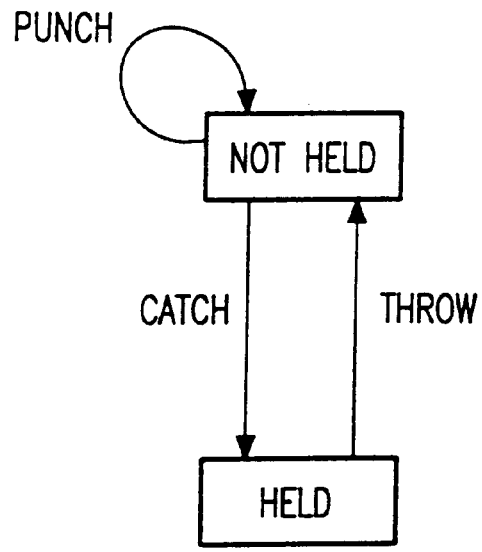
FIG. 6 is a state diagram for a movable object within the virtual environment.

Beginning with the ball 32, this is an "inactive" object incapable of instigating actions itself and has only two states "HELD" and "NOT HELD", as indicated in the state diagram of FIG. 6. However, the ball also needs to know whether it has been grabbed, thrown or punched (and which object imparted that action on it) and this is stored as an action "message" to the ball in a common data structure holding states for all manipulatable objects. These messages are given to the ball object by one of the "active" objects (be it the human user or one of the autonomous characters) that instigated the action on the ball. The conditions determining which message is given, and hence what state results to the object, are described below. In some circumstances, it may be necessary to prevent certain state transitions occurring immediately after one type of transition has occurred, and it should be noted here that a state transition does not necessarily mean proceeding from one state to a new state—the transition may be a loop into the same state. Certain actions may start state timers, which would then prohibit further transitions until the timer has expired. The duration of the timer may suitably be determined from the action that led to the state transition.

In addition to the ball needing to know whether or not it is held, each of the player objects provided with such a claw 30 needs to know whether its claw is holding the ball or not, and at least the human users virtual claw has states regarding its degree of closure "OPEN" and "CLOSED". An equivalent to the state machine of CPU 12 used to control the users claw (and its interaction with the ball 32) may also be used to control similar claws of other autonomous characters within the virtual environment, suitably under control of a population of software agents, although a simpler purely reactive programmed response to conditions may be used.

The decision as to which state the virtual claw should be in is dependent on whether or not the claw has possession of the ball. The actual condition is essentially the same in both cases—the claw is said to be closed if the current processed grip is greater than a certain threshold and open otherwise. However, if the claw does not have possession of the ball, the threshold used (the "grip threshold" GT) is larger in magnitude than that used otherwise (the "grip release threshold" GRT). This is done to make it easier for the user to keep hold of the ball once it has been caught, by requiring less pressure to be exerted on pressure sensor 22.

Figure 7:
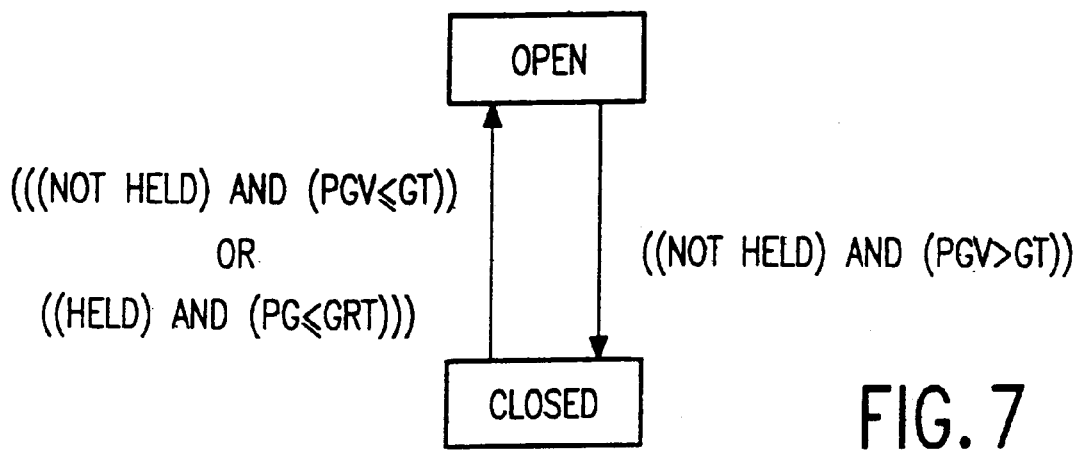
FIG. 7 is a state diagram for the virtual manipulator.

This is illustrated in FIG. 7 which shows a state diagram for the claw mechanism. In order to make decisions about whether the ball has been caught, thrown or punched, it is also necessary to store the previous state of the claw.

Turning now to actions, the following is a description of the different actions that can be carried out on the ball, with the conditions necessary to allow that action. Once an action has been successfully executed, all relevant data structure fields are updated to hold the new state information.

Starting with catching, this is the transition for the ball object 32 from NOT HELD to HELD, as shown in FIG. 6. The ball is said to have been caught if the following conditions are all true:

the user did not previously have possession of the ball the claw was previously open the claw is currently closed the distance D from the centre of the ball to the centre of the claw (as shown in FIG. 3) is less than a certain "catching distance" constant.

As long as the ball is being held, the hinge angle θ of the fingers of the claw is hard set to a value (PI/4 in the earlier example) which will give the impression that the claw has been closed around the ball. The claw will therefore not close any further, even if the user grips the controller 18 more tightly. Note that the "centre" of the claw from which D is measured is a fixed point relative to the "wrist" 36 and does not alter as the claw closes.

The next action is throwing, which causes a transition for the ball from HELD to NOT HELD in FIG. 6. The ball is said to have been thrown if:

the user previously had possession of the ball the claw was previously closed the claw is currently open.

In addition, the ball is given a velocity which is calculated from the trajectory of the claw during the throw, as will be described below. The velocity value is copied into the ball objects data structure in the form of a message from the object which threw the ball. As will be noted, if the claw is (and has recently been) stationary, the imparted velocity will be zero, and reclosing the claw will recapture the ball, fulfilling the above conditions for catching.

The final action is punching or pushing, which causes a state transition but not a change of state, as can be seen in FIG. 6—it only loops from NOT HELD back to NOT HELD. The ball is said to have been punched if:

the user did not previously have possession of the ball the claw was previously closed the claw is currently closed the distance D from the centre of the ball to the centre of the claw is less than a certain "punching distance" constant.

To reflect the fact that the ball has been punched, it is given a velocity which is calculated from the velocity of the claw during the punch, as will be described below. The mechanism of the ball obtaining the velocity value is the same as for a throw.

We have found that calculating the velocity from the last two positions of the claw is generally insufficient in terms of the perceived realism of the result. Instead, a "claw history" structure is defined in CPU 12 which contains the last n virtual world positions of the claw along with the times at which those positions were recorded, where n is an integer constant, and is preferably greater than or equal to 3. The velocity to be used is calculated by averaging (or otherwise combining) the position vectors obtained from the claw history and dividing by the time taken to get from the oldest to the newest position.

The velocity may be accompanied by a calculated value for spin imparted from the manipulator to the object based on detection of rotational motion applied to the controller 18. In such a case, "spinning" and "not spinning" may be added as state variables for the object, and the rotation may be taken into account when modelling, for example, two moving objects within the virtual environment.

Since, as mentioned above, the simulation loop iteration frequency may vary in dependence on processing requirements, a velocity calculation based on per-loop monitoring may generate inaccurate results. In order to avoid this, a real time history (i.e independent of the simulation loop) is suitably maintained for actual velocity of the controller 18 over the last 3 seconds or so.

In summary, the present invention enables the provision of a method and apparatus for providing user-directed operation of a virtual manipulator, such as a simulated hand or claw within a computer-generated virtual environment. The environment comprises one or more objects which may be held, released or impelled by the manipulator under user control. Movement of the virtual manipulator is directed by a suitable hand held device operated by a user, with a simple control directing opening or closing of the claw. In operation, actions such as throwing, catching or punching an object are partially automated, with the decision as to the action initiated being determined by the separation between object and manipulator, and the current and previous states of each as recorded in the form of respective state variables. A method for the derivation of an applied velocity for the object acted upon has also been described.

From reading the present disclosure, other modifications will be apparent to persons skilled in the art. Such modifications may involve other features which already known in the field of virtual environment modelling, manipulating and processing apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method for providing user-directed operation of a virtual manipulator within a computer-generated virtual environment, said environment comprising one or more objects which may be held, released or impelled by the manipulator under user control, the method comprising:

providing user operable positional input means by use of which the user is enabled to move the virtual manipulator about the virtual environment;

providing user operable actuator means in response to operation of which by the user the virtual manipulator is changed from a holding to a releasing orientation, or from a releasing to a holding orientation;

providing automation of manipulation actions on an object by the manipulator when certain predetermined and periodically monitored conditions are found to be true, said conditions comprising at least: Whether or not the manipulator was previously in a holding orientation; the separation of the manipulator and the said object; whether or not the manipulator is currently in a holding orientation; and whether or not the manipulator previously held the object;

the providing automation includes storing respective data structures for the manipulator and at least one object, for the manipulator the data structure including a state variable having only two states indicating whether the manipulator is displayed in one pre-defined releasing (open) position or one pre-defined holding (closed) position, and for the object a state variable having only two states indicating whether the object is held or not held, said providing automation further including eliminating at least one calculation step of a relative characteristic between the object and the manipulator when the state variable for the object indicates the object is held and the state variable for the manipulator indicates the manipulator is in a holding orientation.

2. A method as claimed in claim 1, wherein the automated manipulation action comprises the manipulator taking hold of an object when the manipulator is changed from a releasing to a holding orientation and the separation of the manipulator and the said object is less than or equal to a first predetermined threshold value, the threshold value corresponding to a space between the manipulator and the object.

3. A method as claimed in claim 1, wherein the automated manipulation action comprises the manipulator releasing a currently held object when the manipulator is changed from a holding to a releasing orientation.

4. A method as claimed in claim 3, wherein the currently held object is given a velocity on release, said velocity being derived from the user directed motion of the manipulator prior to release.

5. A method as claimed in claim 4, wherein a record is maintained of the n most recent locations of the manipulator within the virtual environment and the times at which the manipulator was at these locations, and the derived velocity applied to the object is determined by averaging a calculated velocity for the manipulator at two or more of these locations.

6. A method as claimed in claim 1, wherein the automated manipulation action comprises impelling the object with a velocity derived from the preceding user directed motion of the manipulator, when the separation of the manipulator and the said object is less than or equal to a second predetermined threshold value and the manipulator is in the holding orientation prior to, and during, the determination of separation.

7. A method as claimed in claim 6, wherein a record is maintained of the n most recent locations of the manipulator within the virtual environment and the times at which the manipulator was at these locations, and the derived velocity applied to the object is determined by averaging a calculated velocity for the manipulator at two or more of these locations.

8. Virtual manipulator modelling and control apparatus operable to generate and animate under user direction a representation of a manipulator in a virtual environment and the interaction thereof with representations of at least one object also generated within the virtual environment, the apparatus comprising:

a first data store, holding data defining the virtual environment and each object therein;

a second data store, holding data defining features of the virtual manipulator representation;

a user-operable control device; and processing means arranged to generate a representation of the virtual environment based on data from the first data store and from a first viewpoint, to generate the manipulator representation within the virtual environment based on data from the second data store, and to periodically modify the generated manipulator representation in response to signals received from the user-operable control means;

characterised in that the apparatus further comprises:

storage means holding respective data structures for the manipulator and for each object, said data structures being periodically updated by the processing means and containing for the manipulator a state variable having only two states indicating whether the manipulator is displayed in one pre-defined releasing (open) orientation or one pre-defined holding (closed) orientation and for each object a state variable having only two states indicating whether or not the object is currently held or not held by the manipulator; and first position determination means arranged to determine a current separation within the virtual environment between the manipulator representation and an object representation, the processing means autonomously implementing one or more manipulator actions on an object when the said current separation is less than or equal to a predetermined value, and the current and at least one preceding one of the state variables have predetermined settings, said autonomously implementing including eliminating at least one calculation step of a relative characteristic between the object and the manipulator when the state variable for the object indicates the object is held and the state variable for the manipulator indicates the manipulator is in a holding orientation.

9. Apparatus as claimed in claim 8, wherein the user-operable control device is arranged to be held in a users hand, the apparatus including second position determining means operable to detect a location of said control device relative to a predetermined origin position, and said processing means is arranged to periodically modify said generated representation of the manipulator within the virtual environment to reproduce movements of the hand-held control device in said manipulator.

10. Apparatus as claimed in claim 9, wherein the user operable control device comprises a pressure sensor arrange to determine a force exerted by the user, wherein when the exerted force exceeds a first threshold value, the processing means is arranged to modify the generated manipulator representation from an open orientation to a closed orientation, and modify the corresponding stored state variable.

11. Apparatus as claimed in claim 10, wherein the generated manipulator representation is modified from a closed orientation to an open orientation when the exerted force drops below the first threshold when no object is held by the manipulator and below a second threshold value lower than the first when an object is held.

12. Apparatus as claimed in claim 8, wherein the user operable control device comprises a pressure sensor arrange to determine a force exerted by the user, wherein when the exerted force exceeds a first threshold value, the processing means is arranged to modify the generated manipulator representation from an open orientation to a closed orientation, and modify the corresponding stored state variable, and wherein the generated manipulator representation is modified from a closed orientation to an open orientation when the exerted force drops below the first threshold when no object is held by the manipulator and below a second threshold value lower than the first when an object is held.

* * * * *